United States Patent
Cole et al.

(10) Patent No.: US 8,832,341 B2
(45) Date of Patent: Sep. 9, 2014

(54) DYNAMICALLY DETERMINING A PRIMARY OR SLAVE ASSIGNMENT BASED ON RECEIVING A POWER SIGNAL FROM THE CABLE AT THE PORT OF A DEVICE

(75) Inventors: Charles A. Cole, Cary, NC (US); Phillip D. Jones, Raleigh, NC (US); Adrian X. Rodriguez, Durham, NC (US); Jared T. Siirila, Durham, NC (US); Ping Zhou, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 13/246,312

(22) Filed: Sep. 27, 2011

(65) Prior Publication Data

US 2013/0080669 A1    Mar. 28, 2013

(51) Int. Cl.
| G06F 13/00 | (2006.01) |
| G06F 3/00 | (2006.01) |
| G06F 13/42 | (2006.01) |
| G06F 13/364 | (2006.01) |

(52) U.S. Cl.
CPC ............ *G06F 13/426* (2013.01); *G06F 13/364* (2013.01)
USPC ............................ 710/110; 710/12; 710/305

(58) Field of Classification Search
CPC .................................................... G05B 19/054
USPC .................... 710/300–317, 62–64, 8–19, 1–2
See application file for complete search history.

(56) References Cited

U.S. PATENT DOCUMENTS

| 5,121,500 | A | 6/1992 | Arlington et al. | |
| 5,909,557 | A | 6/1999 | Betker et al. | |
| 6,678,721 | B1 | 1/2004 | Bell | |
| 6,766,222 | B1 | 7/2004 | Duley | |
| 7,177,910 | B1 | 2/2007 | Bell | |
| 7,281,070 | B2 | 10/2007 | Bomhoff et al. | |
| 7,882,290 | B2 | 2/2011 | Lin | |
| 8,271,693 | B2 * | 9/2012 | Unuma et al. | 710/8 |
| 2003/0065730 | A1 | 4/2003 | Jones et al. | |
| 2004/0218620 | A1 | 11/2004 | Palm et al. | |
| 2005/0165997 | A1 * | 7/2005 | Sakaki et al. | 710/313 |
| 2006/0069841 | A1 * | 3/2006 | Qin et al. | 710/313 |
| 2007/0208818 | A1 | 9/2007 | Manders | |
| 2009/0077193 | A1 | 3/2009 | Parris et al. | |
| 2012/0271979 | A1 * | 10/2012 | Considine et al. | 710/306 |

FOREIGN PATENT DOCUMENTS

| CN | 101958797 A | 1/2011 |
| JP | 10-108278 | 4/1998 |

* cited by examiner

*Primary Examiner* — Raymond Phan
(74) *Attorney, Agent, or Firm* — Edward J. Lenart; Katherine S. Brown; Biggers Kennedy Lenart Spraggins LLP

(57) ABSTRACT

Methods, apparatuses, and computer program products for dynamically determining a primary or slave assignment based on an order of cable connection between two devices are provided. Embodiments include detecting, by a first device, insertion of one end of a cable into a port of the first device; determining, by the first device, whether a power signal is received from the cable at the port of the first device; if the power signal is received, performing, by the first device, a data transfer operation over the cable as a slave device to a second device that is coupled to the other end of the cable; and if the power signal is not received, performing, by the first device, a data transfer operation over the cable as a primary device to the second device that is coupled to the other end of the cable.

18 Claims, 4 Drawing Sheets

DYNAMICALLY DETERMINING A PRIMARY OR SLAVE ASSIGNMENT BASED ON RECEIVING A POWER SIGNAL FROM THE CABLE AT THE PORT OF A DEVICE

BACKGROUND OF THE INVENTION

1. Field of the Invention

The field of the invention is data processing, or, more specifically, methods, apparatuses, and computer program products for dynamically determining a primary or slave assignment based on an order of cable connection between two devices.

2. Description of Related Art

In a primary/slave model of communication, one device or process has unidirectional control over one or more of the other devices. In some systems, a primary device is elected from a group of eligible devices with the other devices acting in the role of slaves. The standard Universal Serial Bus (USB) specification is an example of a primary/slave architecture in which the USB host (also known as a primary device) acts as the protocol master and a USB device acts as a peripheral device (also known as a slave device). According to the USB specification, only the primary device can schedule the configuration and data transfers over the link. The USB slave devices cannot initiate data transfers, they only respond to requests given by the primary device. In the USB On-The-Go (USB OTG) specification, USB devices such as digital audio players or mobile phones may also act as a primary device that hosts another USB device. That is, USB OTG enables a USB device to perform both the primary device and slave device roles. The default link configuration is that the device connected to the 'A' end of the cable (known as A-device) acts as the USB host and the device coupled to the 'B' end of the cable (known as B-device) acts as the USB Peripheral device. That is, the A-device acts as the primary device, while the B-device acts as the slave device. The OTG A-device is a power supplier and an OTG B-device is a power consumer. If a user connects the A and B devices in the wrong direction for the task they want to perform, the USB OTG specification includes protocols that enable the devices to switch roles. That is, devices using this protocol rely on additional configuration transfers between the devices to determine which device will act as primary device and which will act as a slave device. In a datacenter with hundreds or even thousands of cables and devices with limited device user interfaces, it may be difficult for an administrator to determine if the devices are coupled correctly.

SUMMARY OF THE INVENTION

Methods, apparatuses, and computer program products for dynamically determining a primary or slave assignment based on an order of cable connection between two devices are provided. Embodiments include detecting, by a first device, insertion of one end of a cable into a port of the first device; determining, by the first device, whether a power signal is received from the cable at the port of the first device; if the power signal is received, performing, by the first device, a data transfer operation over the cable as a slave device to a second device that is coupled to the other end of the cable; and if the power signal is not received, performing, by the first device, a data transfer operation over the cable as a primary device to the second device that is coupled to the other end of the cable.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
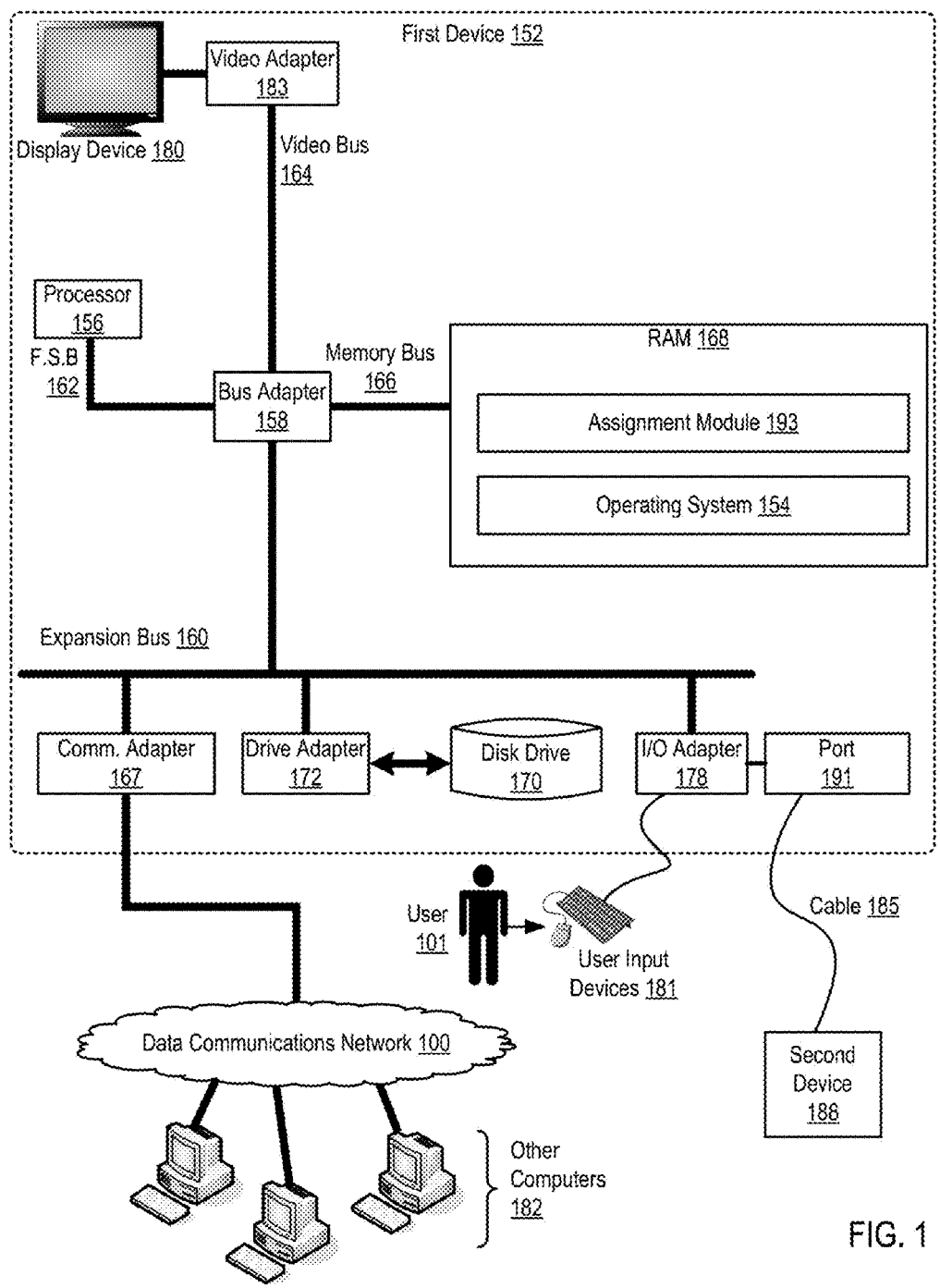
FIG. 1 sets forth a block diagram of automated computing machinery comprising an exemplary computer useful in dynamically determining a primary or slave assignment based on an order of cable connection between two devices according to embodiments of the present invention.

Exemplary methods, apparatus, and products for dynamically determining a primary or slave assignment based on an order of cable connection between two devices in accordance with the present invention are described with reference to the accompanying drawings, beginning with FIG. 1. Dynamically determining a primary or slave assignment based on an order of cable connection between two devices in accordance with the present invention is generally implemented with computers, that is, with automated computing machinery. FIG. 1 sets forth a block diagram of automated computing machinery comprising an exemplary computer (152) useful in dynamically determining a primary or slave assignment based on an order of cable connection between two devices according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an assignment module (193) that includes computer program instructions for dynamically determining a primary or slave assignment based on an order of cable connection between two devices according to embodiments of the present invention. Specifically, the assignment module (193) includes computer program instructions that when executed by the processor (156) cause the first device (152) to carry out the steps of: detecting, by a first device, insertion of one end of a cable into a port of the first device; determining, by the first device, whether a power signal is received from the cable at the port of the first device; if the power signal is received, performing, by the first device, a data transfer operation over the cable as a slave device to a second device that is coupled to the other end of the cable; and if the power signal is not received, performing, by the first device, a data transfer operation over the cable as a primary device to the second device that is coupled to the other end of the cable.

Also stored in RAM (168) is an operating system (154). Operating systems useful dynamically determining a primary or slave assignment based on an order of cable connection between two devices according to embodiments of the present invention include UNIX™, Linux™, Microsoft XP™, AIX™, IBM's i5/OS™, and others as will occur to those of skill in the art. The operating system (154) and the assignment module (193) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for dynamically determining a primary or slave assignment based on an order of cable connection between two devices according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

In the example of FIG. 1, the I/O adapter (178) is coupled to a port (191) that is in turn is coupled to a second device (188) via a cable (185). The port (191) may be any type of I/O port. For example, the port (191) may be a USB port and the second device (188) may be a USB device such as a printer. According to embodiments of the present invention, the order in which the cable (185) is plugged into the devices (192, 188) determines the assignment of the primary device and the slave device roles among the devices (192, 188). For example, if the first device (152) is plugged into the cable (185) first and then the second device (188) is coupled to the cable (185), the first device (152) will assume the role of primary device and the second device (188) will assume the role of slave device. In this example, if a user desired to reassign those roles, the user would disconnect the cable (185) from the devices (152, 188) and plug the cable first into the second device (188) and then into the first device (152). By assigning the roles of primary device and slave device in accordance with an order of cable connection, a user may immediately know the role assignments without examining a user interface. In addition, switching the roles simply involves switching the order of cable connection—not transmitting additional configuration information between the two devices.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically determining a primary or slave assignment based on an order of cable connection between two devices according to embodiments of the present invention include modems for wired dial-up communications, Ethernet (IEEE 802.3) adapters for wired data communications network communications, and 802.11 adapters for wireless data communications network communications.

Figure 2:
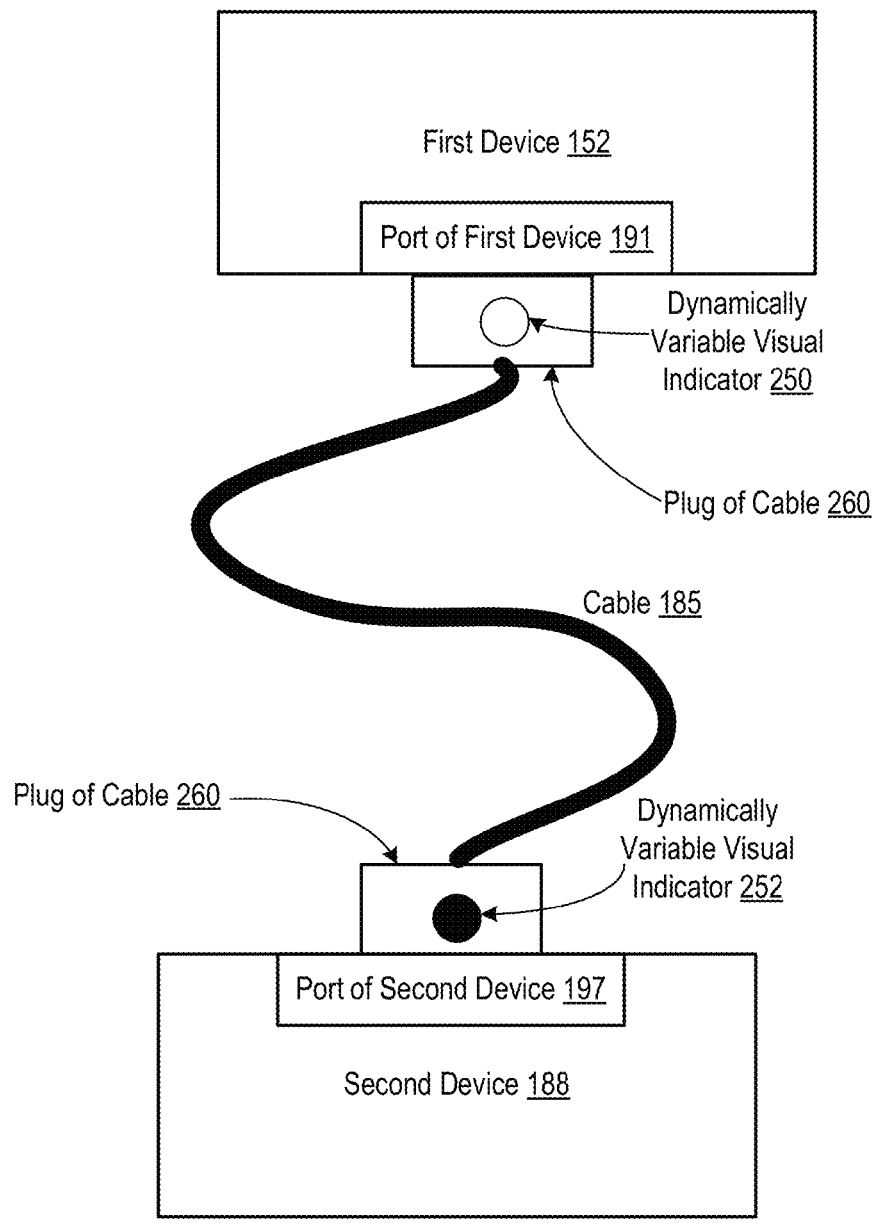
FIG. 2 sets forth a diagram of an apparatus that includes a first device and a second device connected by a cable with a visual indicator that dynamically indicates a primary or slave assignment based on an order of cable connection between two devices according to embodiments of the present invention.

FIG. 2 sets forth a diagram of an apparatus that includes a first device (152) and a second device (188) connected by a cable (185) with a visual indicator (250) that dynamically indicates a primary device or slave device assignment based on an order of cable connection between the two devices according to embodiments of the present invention. In the example of FIG. 2, on each of the cable is a plug (260) that includes a dynamically variable visual indicator (250). A plug is used to couple a cable with a port of a device. For example, when the cable is a USB cable, the plug may be a Standard-A plug type USB, a B-plug, mini-A plug, a mini-B plug, or any other type of plug compatible with the specific cable type.

A visual indicator may be any type of indicator capable of indicating to a user of the cable a particular status corresponding to slave device and primary device assignments. Examples of visual indicators include a light emitting diode (LED), a light bulb, a switch, and many others aw will occur to those of skill in the art. The visual indicator (250) of FIG. 2 is configured to determine which end of the cable (185) received power first from one of the first device (152) and the second device (188). For example the cable (185) may include a latch that switches based on current direction within the cable, thus determining which end received power first. The visual indicator (250) of FIG. 2 is also configured to indicate whether the particular end of the cable (185) is coupled to a slave device or to a primary device. This enables a user to quickly examine the cable (185) to determine if the devices (152, 188) are properly connected. If the cable (185) is not connected properly, a user would simply decouple the cable (185) from the devices (152, 188) and plug the cable (185) into the devices (152, 188) in an order that would establish the desired slave device and primary device assignments. For example, as illustrated in FIG. 2, the visual indicator (250) on the end of the cable plugged into the first device (152) is 'on' and the visual indicator (250) on the end of the cable plugged into the second device (188) is 'off,' thus indicating that the first device (152) is assigned the primary device role and the second device (188) is assigned the slave device role. If a user desired to change those assignments, the user could unplug both ends of the cable (185) from the devices (152, 188) and plug in one end of the cable (185) to the second device (188) and plug in the other end of the cable (185) to the first device (152). As a result, the visual indicator attached to the end of the cable (185) inserted into the second device (188) would be 'on' and the other visual indicator (250) attached to the end of the cable (185) inserted into the first device (152) would be 'off.' In the example of FIG. 2, the visual indicator (250) is attached to each end of the cable (185) at a plug. However, according to embodiments of the present invention, a visual indicator may be attached anywhere on a cable and may include one or more visual indications to indicate the primary device and slave device assignments.

Figure 3:
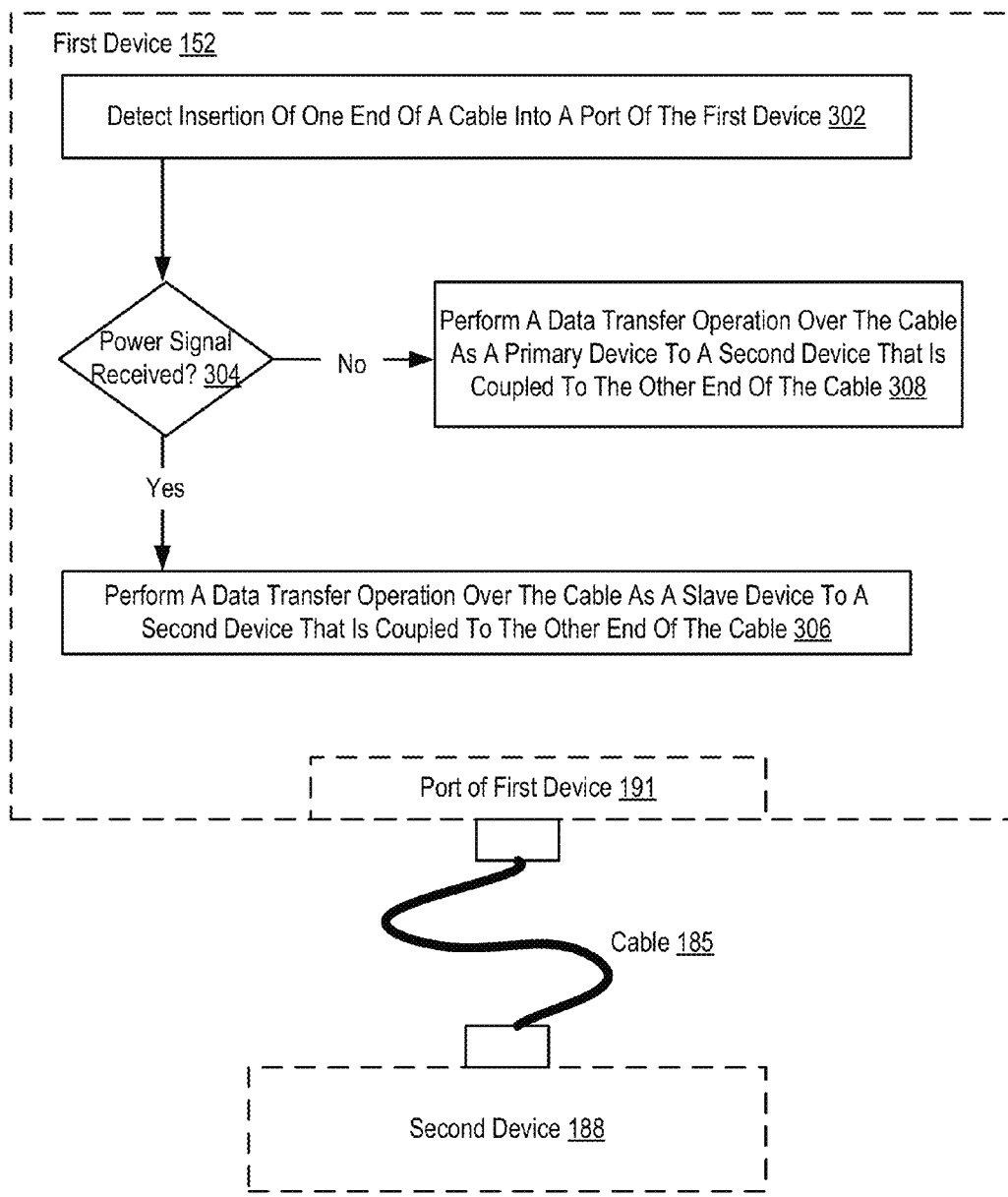
FIG. 3 sets forth a flow chart illustrating an exemplary method for dynamically determining a primary or slave assignment based on an order of cable connection between two devices according to embodiments of the present invention.

For further explanation, FIG. 3 sets forth a flow chart illustrating an exemplary method for dynamically determining a primary or slave assignment based on an order of cable connection between two devices according to embodiments of the present invention. The method of FIG. 3 includes detecting (302), by a first device (152), insertion of one end of a cable (185) into a port (191) of the first device (152). Detecting (302) insertion of one end of a cable (185) into a port (191) of the first device (152) may be carried out by receiving a message indicating that a hardware change corresponding to the port (191) has occurred; and periodically measuring a capacitance on the port (191) to determine whether there is another device attached.

The method of FIG. 3 also includes determining (304), by the first device (152), whether a power signal is received from the cable (185) at the port (191) of the first device (152). Determining (304) whether a power signal is received from the cable (185) at the port (191) of the first device (152) may be carried out by detecting a change in voltage level at one or more pins within the port (191).

The method of FIG. 3 includes if the power signal is received, performing (306), by the first device (152), a data transfer operation over the cable (185) as a slave device to a second device (188) that is coupled to the other end of the cable (185). Performing (306) a data transfer operation over the cable (185) as a slave device to a second device (188) that is coupled to the other end of the cable (185) may be carried out by receiving via the cable (185), a data transfer request from the second device (188); and transmitting via the cable (185), a data transfer request response to the second device (188).

The method of FIG. 3 also includes if the power signal is not received, performing (308), by the first device (152), a data transfer operation over the cable (185) as a primary device to the second device (188) that is coupled to the other end of the cable (185). Performing (308) a data transfer operation over the cable (185) as a primary device to the second device (188) that is coupled to the other end of the cable (185) may be carried out by transmitting via the cable (185), a data transfer request to the second device (188); and receiving via the cable (185), a data transfer request response from the second device (188).

Figure 4:
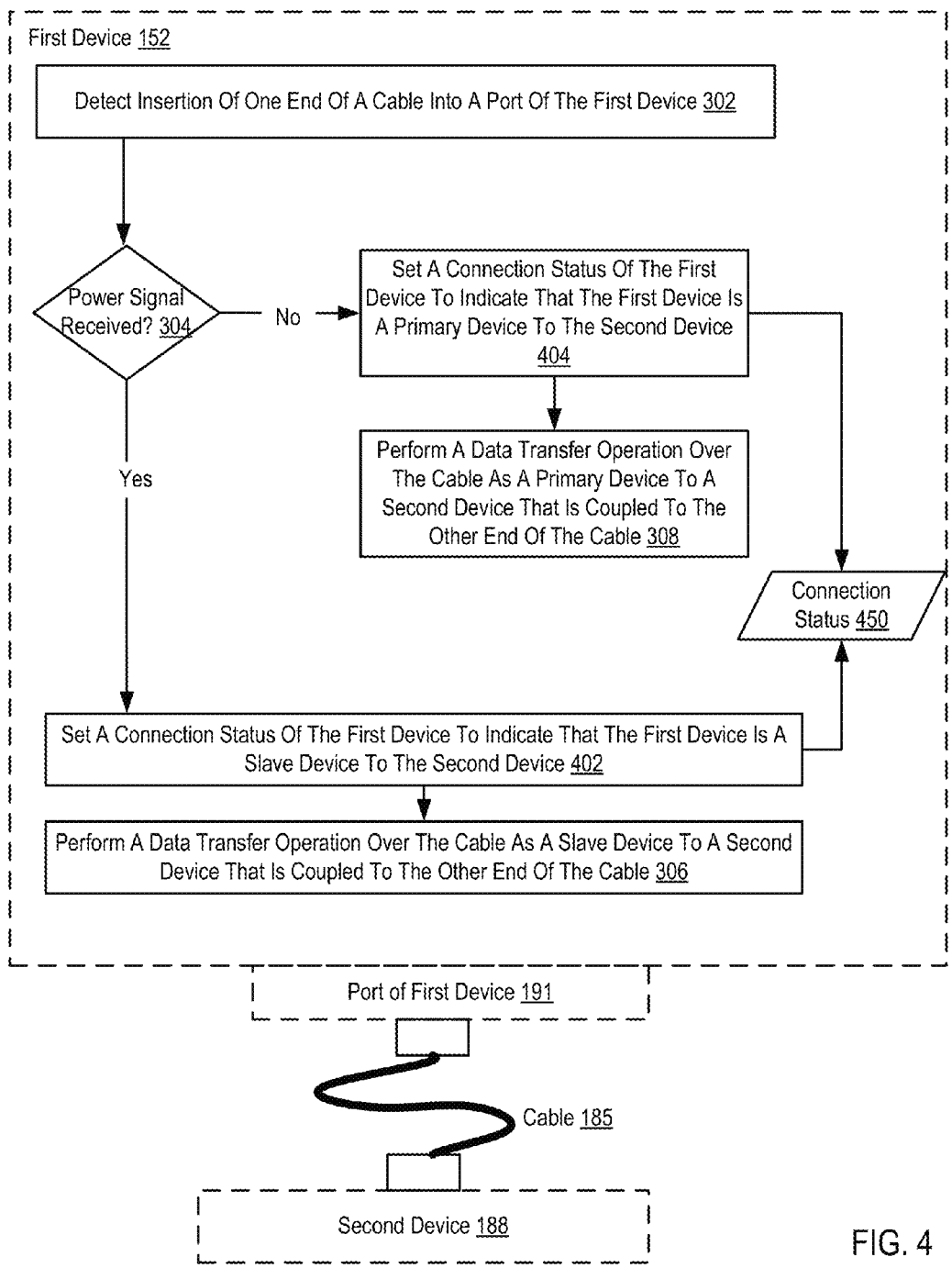
FIG. 4 sets forth a flow chart illustrating a further exemplary method for dynamically determining a primary or slave assignment based on an order of cable connection between two devices according to embodiments of the present invention.

For further explanation, FIG. 4 sets forth a flow chart illustrating a further exemplary method for dynamically determining a primary or slave assignment based on an order of cable connection between two devices according to embodiments of the present invention. The method of FIG. 4 is similar to the method of FIG. 3 in that the method of FIG. 4 also includes detecting (302), by a first device (152), insertion of one end of a cable (185) into a port (191) of the first device (152); determining (304), by the first device (152), whether a power signal is received from the cable (185) at the port (191) of the first device (152); if the power signal is received, performing (306), by the first device (152), a data transfer operation over the cable (185) as a slave device to a second device (188) that is coupled to the other end of the cable (185); and if the power signal is not received, performing (308), by the first device (152), a data transfer operation over the cable (185) as a primary device to the second device (188) that is coupled to the other end of the cable (185).

The method of FIG. 4, however, also includes if the power signal is received, setting (402) a connection status (450) of the first device (152) to indicate that the first device (152) is a slave device to the second device (188). A connection status is a data value indicating whether the first device (152) is to act as a primary device or a slave device. Based on the connection status, the first device (152) may implement one or more slave device specific protocols or series of data transfer operations. For example, the first device (152) acting as a slave device may wait to receive data transfer requests and may not initiate data transfer requests. In addition, the assignment module (193) of the first device (152) may provide the connection status (450) to other applications, such as the operating system (154) of FIG. 1. Setting (402) a connection status (450) of the first device (152) to indicate that the first device (152) is a slave device to the second device (188) may be carried out by storing a value within the first device (152).

The method of FIG. 4 also includes if the power signal is not received, setting (404) the connection status (450) of the first device (152) to indicate that the first device (152) is a primary device to the second device (188). Based on the connection status, the first device (152) may implement one or more primary device specific protocols or series of data transfer operations. For example, the first device (152) acting as a primary device may supply the cable with power and initiate data transfer operations over the cable. Setting (404) the connection status (450) of the first device (152) to indicate that the first device (152) is a primary device to the second device (188) may be carried out by storing a value within the first device (152).

Exemplary embodiments of the present invention are described largely in the context of a fully functional computer system for dynamically determining a primary or slave assignment based on an order of cable connection between two devices. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically determining a primary or slave assignment based on an order of cable connection between two devices, the method comprising:
    detecting, by a first device, insertion of one end of a cable into a port of the first device;
    determining, by the first device, whether a power signal is received from the cable at the port of the first device;
    if the power signal is received, performing, by the first device, a data transfer operation over the cable as a slave device to a second device that is coupled to the other end of the cable; and
    if the power signal is not received, performing, by the first device, a data transfer operation over the cable as a primary device to the second device that is coupled to the other end of the cable.

2. The method of claim 1 wherein the power signal is received in response to the second device supplying the cable with power.

3. The method of claim 1 wherein the cable includes a dynamically variable visual indicator at a particular end of the cable, the visual indicator to dynamically indicate whether the particular end of the cable is coupled to a slave device or to a primary device.

4. The method of claim 1 further comprising:
   if the power signal is received, setting a connection status of the first device to indicate that the first device is a slave device to the second device; and
   if the power signal is not received, setting a connection status of the first device to indicate that the first device is a primary device to the second device.

5. The method of claim 1 wherein the port of the first device is a universal serial bus (USB) port.

6. The method of claim 3 wherein the visual indicator of the cable is configured to detect which end of the cable first received power from one of the first device and the second device.

7. An apparatus for dynamically determining a primary or slave assignment based on an order of cable connection between two devices, the apparatus comprising a computer processor, a computer memory operatively coupled to the computer processor, the computer memory having disposed within it computer program instructions that when executed by the computer processor cause the computer processor to carry out the steps of:
   detecting, by a first device, insertion of one end of a cable into a port of the first device;
   determining, by the first device, whether a power signal is received from the cable at the port of the first device;
   if the power signal is received, performing, by the first device, a data transfer operation over the cable as a slave device to a second device that is coupled to the other end of the cable; and
   if the power signal is not received, performing, by the first device, a data transfer operation over the cable as a primary device to the second device that is coupled to the other end of the cable.

8. The apparatus of claim 7 wherein the power signal is received in response to the second device supplying the cable with power.

9. The apparatus of claim 7 wherein the cable includes a dynamically variable visual indicator at a particular end of the cable, the visual indicator to dynamically indicate whether the particular end of the cable is coupled to a slave device or to a primary device.

10. The apparatus of claim 7 further comprising:
    if the power signal is received, setting a connection status of the first device to indicate that the first device is a slave device to the second device; and
    if the power signal is not received, setting a connection status of the first device to indicate that the first device is a primary device to the second device.

11. The apparatus of claim 7 wherein the port of the first device is a universal serial bus (USB) port.

12. The apparatus of claim 9 wherein the visual indicator of the cable is configured to detect which end of the cable first received power from one of the first device and the second device.

13. A computer program product for dynamically determining a primary or slave assignment based on an order of cable connection between two devices, the computer program product disposed upon a computer readable storage medium, the computer program product comprising computer program instructions capable, when executed, of causing a computer to carry out the steps of:
    detecting, by a first device, insertion of one end of a cable into a port of the first device;
    determining, by the first device, whether a power signal is received from the cable at the port of the first device;
    if the power signal is received, performing, by the first device, a data transfer operation over the cable as a slave device to a second device that is coupled to the other end of the cable; and
    if the power signal is not received, performing, by the first device, a data transfer operation over the cable as a primary device to the second device that is coupled to the other end of the cable.

14. The computer program product of claim 13 wherein the power signal is received in response to the second device supplying the cable with power.

15. The computer program product of claim 13 wherein the cable includes a dynamically variable visual indicator at a particular end of the cable, the visual indicator to dynamically indicate whether the particular end of the cable is coupled to a slave device or to a primary device.

16. The computer program product of claim 13 further comprising:
    if the power signal is received, setting a connection status of the first device to indicate that the first device is a slave device to the second device; and
    if the power signal is not received, setting a connection status of the first device to indicate that the first device is a primary device to the second device.

17. The computer program product of claim 13 wherein the port of the first device is a universal serial bus (USB) port.

18. The computer program product of claim 15 wherein the visual indicator of the cable is configured to detect which end of the cable first received power from one of the first device and the second device.

* * * * *